United States Patent [19]

Smith

[11] Patent Number: 4,599,687

[45] Date of Patent: Jul. 8, 1986

[54] ELECTRICAL POWER SUPPLY FOR A MOTOR VEHICLE

[75] Inventor: Bernard R. Smith, North Perth, Australia

[73] Assignee: Ayr Pty. Ltd., East Victoria Park, Australia

[21] Appl. No.: 672,259

[22] PCT Filed: Mar. 9, 1984

[86] PCT No.: PCT/AU84/00040

§ 371 Date: Nov. 1, 1984

§ 102(e) Date: Nov. 1, 1984

[87] PCT Pub. No.: WO84/03595

PCT Pub. Date: Sep. 13, 1984

[30] Foreign Application Priority Data

Mar. 9, 1983 [AU] Australia ............... PF8363

[51] Int. Cl.[4] ........................... H02M 7/02
[52] U.S. Cl. ....................... 363/61; 363/37; 320/1
[58] Field of Search ............ 363/35, 37, 59, 60, 363/61; 320/1; 307/110

[56] References Cited

U.S. PATENT DOCUMENTS

| | | |
|---|---|---|
| 3,259,830 | 7/1966 | Öjelid ................... 363/61 |
| 3,456,119 | 7/1967 | Schneider . |
| 3,614,459 | 10/1971 | Watson ................. 307/10 R |
| 3,676,694 | 7/1972 | Schneider et al. ........... 307/10 R |
| 3,723,850 | 3/1973 | Daniels et al. . |
| 3,731,179 | 5/1973 | Rademaker . |
| 3,911,292 | 10/1975 | Petrick et al. ............. 307/110 |
| 3,943,428 | 3/1976 | Whidden .................. 363/60 |
| 4,100,474 | 7/1978 | Pfeffer et al. .............. 320/17 |
| 4,214,198 | 7/1980 | Schneider .................. 320/15 |

FOREIGN PATENT DOCUMENTS 2071367 of 0000 United Kingdom .

Primary Examiner—Patrick R. Salce
Assistant Examiner—Anita M. Ault
Attorney, Agent, or Firm—Harness, Dickey & Pierce

[57] ABSTRACT

An electrical power supply which may be used with the electrical system of a motor vehicle. A first input (16) to be connected to a D.C. source (18) and a second input (12) to be connected to an A.C. source (11). The first input provided across a capacitor bridge including an input capacitor (24, 25) and output capacitor (27, 28) in parallel and diodes (23, 26) opposing discharge current from the capacitors to the first input (16). The output (30) is taken across the output capacitor (27, 28). The second input (12) provided in series with the input capacitor (24, 25). The voltage applied to the second input (12) with the charge in the input capacitor raise the charge in the output capacitor (27, 28) providing increased D.C. voltage at the output (30).

Preferably, the capacitor bridge is modified to accommodate pairs of input and output capacitors to utilize both cycles of the A.C. source.

Preferably a sensing means (29) and control means (54) is provided to control the voltage at the output (30).

14 Claims, 2 Drawing Figures

ELECTRICAL POWER SUPPLY FOR A MOTOR VEHICLE

This invention relates to an electrical power supply and particularly to an electrical power supply which is adapted to be connected to the electrical system of a motor vehicle.

It has heretofore been known to employ an electrical power supply on a motor vehicle in conjunction with the conventional electrical system thereof, to provide a power source for the operation of extaneous electrical appliances characterized by requiring a higher or an alternative source of power than that provided by the conventional system.

Indicative of prior art systems of this kind are U.S. Pat. Nos. 3,456,119, 3,614,459, 3,676,694, 4,100,474, 4,214,198 and U.K. Pat. No. 2071367.

As can be readily appreciated from the foregoing devices, the voltage output of an electrical power supply derived from the alternator of a motor vehicle can be controlled in several ways. Firstly, as there is a directly proportional relationship between the angular speed of the rotor field winding of the alternator and the generated e.m.f., the speed of the rotor can be increased or decreased by directly controlling the idling r.p.m. of the vehicle. Accordingly such control is normally provided by adjusting the vehicle throttle until the desired level of output voltage is attained. As exemplified by the prior art, many elaborate electro-mechanical devices have been devised which utilize this technique, however, the cumbersome and complex nature of such devices has always been a major drawback in their implementation.

A second technique utilizes the proportional relationship between the field winding current and the generated e.m.f., whereby the output voltage of the alternator may be increased by correspondingly increasing the current in the field winding thereof. This popular technique usually employs a regulator which controls the current supplied to the field winding by feedback in accordance with the load demands on the system. A problem with this technique resides in the difficulty of providing sufficient power for appliances which operate at a rated high voltage such as 240 volts and, in addition to which, draw high current.

It is an object of this invention to provide an improved electrical power supply which employs circuit means to supply power to an external load which has a relatively high power demand.

In one form the invention resides in an electrical power supply comprising a first input adapted to be connected to an essentially direct current (D.C.) voltage source, a second input adapted to be connected to an essentially alternating current (A.C.) voltage source, a capacitor bridge circuit including an input capacitor, an output capacitor in parallel with said input capacitor, and diodes, and an output connected across said output capacitor; wherein said first input is provided across the capacitor bridge circuit, said diodes are biased to oppose discharge current flow from said capacitors to said first input, and said second input is provided in series with said input capacitor such that the effective charge stored in the input capacitor in conjunction with the A.C. voltage to be applied to the second input raise the effective level of charge stored in the output capacitor to provide a higher level of D.C. voltage at the said output.

According to a preferred feature of the invention the capacitor bridge circuit includes a pair of serially connected input capacitors, a first junction between the input capacitors, a pair of serially connected output capacitors and a second junction between the output capacitors, whereby said second input is provided across said first and second junctions, such that both positive and negative cycles of the A.C. voltage to be applied thereto in conjunction with the charge stored in said input capacitors may be alternatively applied to the corresponding output capacitors.

According to another preferred feature, the capacitor bridge circuit includes a plurality of input capacitors or input capacitor pairs in parallel, having respective second inputs connected respectively in series therewith or across said first and second junctions, and diodes opposing discharge current flow to said first input, whereby the A.C. voltages to be applied to each of said second inputs are out of phase with respect to each other thereby reducing the ripple current in an output capacitor.

According to another preferred feature, a voltage sensing means is connected across the said output and a control means is connected to said voltage sensing means, whereby said voltage sensing means provides a signal indicative of the output voltage of the supply to said control means and the control means regulates the voltage at said inputs to provide control of said supply output voltage.

According to another preferred feature, the voltage sensing means includes switching means to provide selection of different supply output voltages, whereby said signal may be altered.

According to another preferred feature a D.C. to A.C. converter is incorporated across said output to provide an A.C. voltage output.

The invention will be better understood by reference to the following description of one specific embodiment thereof and the accompanying drawings wherein.

Figure 1:
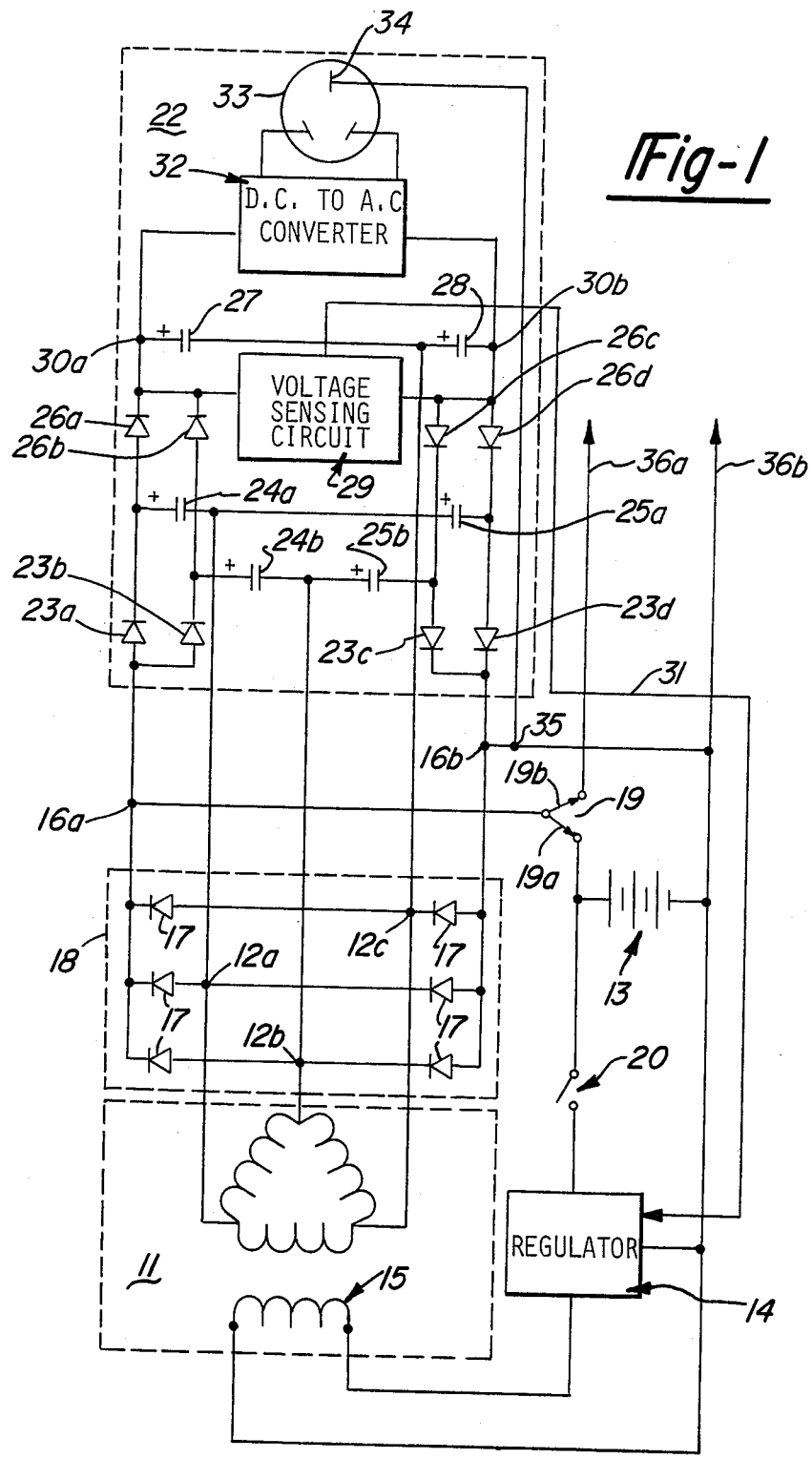
FIG. 1 is a circuit diagram of the electrical power supply.
Figure 2:
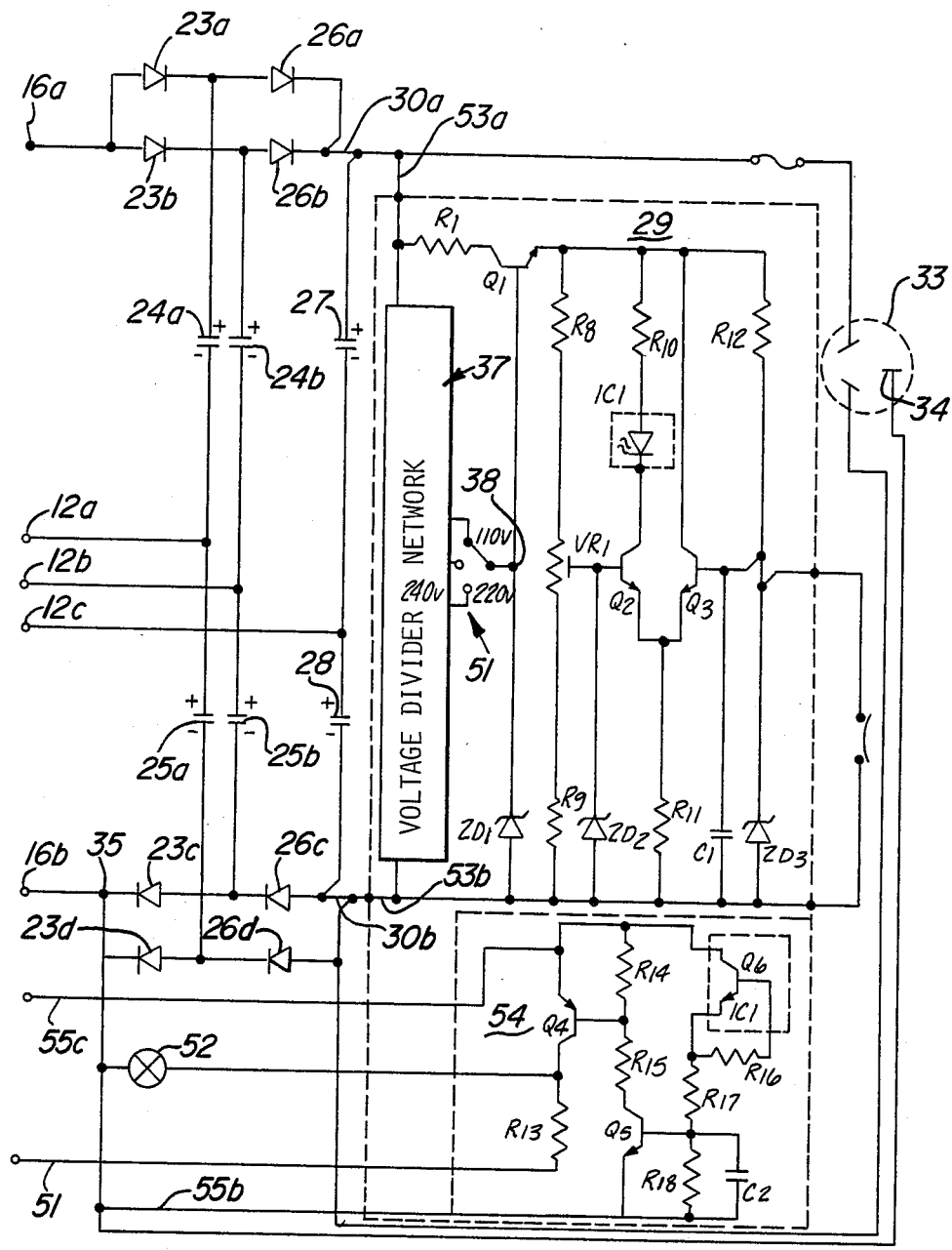
FIG. 2 is a circuit diagram of the power box of the electrical power supply and the voltage sensing means.

The embodiment is directed towards an electrical power supply adapted to be fitted in conjunction with the electrical circuitry of a motor vehicle.

The alternator 11 of a motor vehicle is connected in the delta configuration so as to provide three output voltages at output terminals 12a, 12b and 12c, each being of different phase with respect to each other. The excitation voltage for the field winding 15 of the alternator 11 is provided by means of a regulated D.C. power supply comprising a battery 13 and a regulator 14. The alternator output is rectified by a full wave diode bridge rectifier 18 which comprises six diodes 17, wherein diode pairs are connected across each of the output terminals 12a, 12b and 12c such that an essentially D.C. voltage is produced across voltage supply rails 16a and 16b, rail 16a being positive with respect to rail 16b. This D.C. voltage is applied across the battery 13 via a single pole, double throw switch 19, which is located along the positive supply rail in this embodiment. When the switch 19 is in a first position 19a, the application of the D.C. voltage to the battery 13 enables the battery to be recharged. The ignition switch 20 of the motor vehicle is located between the battery 13 and regulator 14 in order to enable or disable the entire system.

A power box, shown generally at 22, is connected to the D.C. voltage produced at terminals 16a and 16b, and to the A.C. voltage produced at terminals 12a, 12b and 12c. The power box 22 may be operated with the switch 19 in a second position, shown by dotted line 19b in FIG. 1. The rectified D.C. voltage generated across terminals 16a, 16b is applied via respective positive blocking diodes 23a, 23b and negative blocking diodes 23c, 23d to two parallel pairs of serially connected input capacitors 24a, 24b, 25a, 25b, input capacitors 24a, 25a forming on serial pair, and input capacitors 24b, 25b forming the other pair. The A.C. voltage at terminal 12a of the alternator 11 is applied to the common junction between serial input capacitors 24a, 25a so as to produce a first input half of a capacitor bridge circuit. Similarly, the A.C. voltage at terminal 12b of the alternator 11 is applied to the common junction between the other serial input capacitors 24b, 25b so as to produce a second input half of a capacitor bridge circuit. The effectively positive terminals of input capacitors 24a, 24b are respectively connected via second blocking diodes 26a, 26b to the effectively positive input terminal 30a of a serially connected output capacitor pair 27, 28. The effectively negative terminals of input capacitors 25a, 25b are respectively connected via second blocking diodes 26c, 26d to the effectively negative input terminal 30b of the said output capacitor pair 27, 28. The common junction between the serial output capacitors 27, 28 is referenced by connection to the A.C. voltage at terminal 12c of the alternator 11, whereby output capacitors 27 and 28 form the output half of the capacitor bridge circuit. The arrangement of the capacitor bridge circuit is such that different phase voltages of the A.C. voltage developed by the alternator 11 are respectively applied to the two input halves of the circuit, each with reference to the output half of the circuit, such that the output capacitors are continuously shared between the two input halves of the circuit. The operation of the capacitor bridge circuit will now be described. In accordance with the previous description a D.C. voltage is applied across terminals 16a, 16b and hence the input capacitors 24a, 24b and 25a, 25b. Assuming there is initially zero output voltage from the alternator 11 at terminals 12a, 12b, 12c, the input capacitors 24a, 24b and 25a, 25b will be all equally charged and each will have an effective D.C. voltage of stored charge of half the applied D.C. voltage. In addition, the applied D.C. voltage will charge the output capacitors 27 and 28 to an equivalent amount and each will have an effective D.C. voltage of half the applied D.C. voltage.

The pumping action of the capacitor bridge circuit will initially be described with reference to the application of only a single phase of the alternator winding, that being the voltage applied across terminals 12a, 12c. For the purposes of demonstration, terminal 12a is considered positive with respect to 12c. As the voltage applied across terminals 12a, 12c is increased, the negative terminal of input capacitor 24a is raised in potential with respect to the effective reference terminal 12c and hence the output capacitor 27 is further charged via diode 26a to a potential equal to the maximum positive voltage across terminals 12a, 12c plus the voltage of the charge already stored in the input capacitor 24a. The input capacitor 24a is prevented from discharging back into the D.C. supply at terminals 16a, 16b by the presence of blocking diodes 23a, 23d, and the input capacitor 25a is prevented from charging further by the presence of blocking diode 26d. As the potential across terminals 12a, 12c decreases, the output capacitors are prevented from discharging by the presence of blocking diodes 26a, 26d, thereby the increased charge stored in output capacitor 27 is retained. As the potential across terminals 12a, 12c moves into the negative cycle the positive terminal of input capacitor 25a is lowered in potential with respect to the effective reference terminal 12c and hence the output capacitor 28 is further charged via diode 26d to a potential equal to the maximum negative voltage across terminals 12a, 12c plus the voltage of the charge already stored in the input capacitor 25a. The input capacitor 25a is prevented from discharging back into the D.C. supply at terminals 16a, 16b by the presence of blocking diodes 23d, 23a, and the input capacitor 24a is prevented from charging further by the presence of blocking diode 26a. As the potential across terminals 12a, 12c increases towards zero potential again, the output capacitors are prevented from discharging again by the presence of blocking diodes 26d, 26a, thereby the increased charge stored in output capacitor 28 is retained. As the cycle of the applied A.C. voltage at terminals 12a, 12c repeats the charge on the output capacitors is renewed or effectively "topped up" in order to accommodate drainage therefrom by the connection of an external load to the output terminals 30a, 30b of the capacitor bridge circuit.

With reference to the conjunctive operation of three phases derived from the alternating windings, the present embodiment utilizes two of those phases for connection to the two input halves of the capacitor bridge circuit at terminals 12a and 12b, the third phase is used as a reference and is connected directly to the shared terminal 12c of the output capacitors 27 and 28. The effect of using two phases and two input capacitor halves enables the pumping action of the capacitor bridge circuit to be shared between two pairs of input capacitors, thereby reducing the ripple current in the output capacitors and hence overheating caused by external loads drawing high current is substantially mitigated.

A voltage sensing circuit 29 is connected across the output terminals 30a and 30b of the capacitor bridge circuit and is adapted to provide a control signal via a feedback line 31 to the regulator 14 which provides control of the output voltage delivered by the alternator in order to maintain the output voltage of the power supply at a preselected level. The voltage sensing circuit 29 has two sensing inputs 53a, 53b which are taken from the output terminals 30a, 30b of the capacitor bridge circuit. A selector switch 51, being of single pole triple throw type, is included in the voltage sensing circuit to provide manual selection of an output voltage which is intended to be supplied by the power supply to an external load. For example, provision may be made for the selection of either 110 V, 220 V or 240 V D.C.

The inputs 53 are connected to a voltage divider network 37, whereby the switch 51 is arranged to select different combinations of resistors into the network such that a specified operating voltage is provided at the output terminal 38 of the networks 37 when the voltage appearing at the sensing inputs 53 attains the desired level set by the switch. That is, different values of resistance are switched into the voltage divider network in each of the three switch positions such that the same operating voltage level is attained at terminal 38, when the voltage at the sensing inputs reaches the desired level. The output of the voltage divider network 37 is connected to a D.C. amplifier stage Q1, the voltage at output terminal 38 being input to the base of transistor Q1. The amplifier output voltage, derived from the emitter thereof, is connected via a second voltage divider network R8, R9, VR1 to the input of a differential pair Q2, Q3.

The input voltage levels to the differential pair are set by zener diodes ZD2, ZD3 and an opto-isolator IC1 is incorporated into the collector of transistor Q2 to provide an isolated output therefrom. Adjustment of the reference setting of the differential pair is provided by means of the potentiometer VR1.

The photo-sensitive transistor Q6 associated with the opto-isolator IC1, forms the input of an isolated feedback control circuit 54 which is supplied with D.C. voltage along supply lines 55a, 55b. The output of transistor Q6 is connected to a balanced network of biassing resistors R14, R15 and R17, R18, which form the respective inputs of transistors Q4, Q5, in combination which constitute an output amplifier stage. The output of the control circuit 54 is derived from the collector of transmitter Q4, and is feedback to the regulator 14 via line 31. In addition, a lamp 52 is connected to the collector terminal of transistor Q4 to indicate current flow thereat.

In operation, the selector switch 51 is set to the desired voltage level, such that a control signal developed at feedback line 31 controls the operation of the regulator 14, which in turn modifies the input excitation voltage applied to the field winding 15 of the alternator 11 (and consequently the output voltage of the alternator 11), until the actual output voltage of the capacitor bridge circuit is in accordance with the selected voltage level. Whenever the output voltage of the supply generated at output terminals 30a, 30b deviates from the desired level, the voltage appearing at the output terminal 38 will deviate from the normal operating point voltage due to the voltage divider action of the network 37. This effective change of the operating point of transistor Q1 is transmitted to the second voltage divider network which is balanced with the normal operating point thereof. Thus a current will flow in the collector of the Q2 transistor of the differential pair, thereby activating the opto-isolator circuit IC1. The activation of the opto-isolator IC1 effects operation of the isolated feedback control circuit 54, the signal current developed in transistor Q6 being amplified by amplifier stage Q4, Q5 and output as a control signal via feedback line 31 to the regulator 14. The regulator 14 includes a D.C. biassed input circuit to facilitate control of current flow in the field winding 15 of the alternator 11 in accordance with the magnitude of the control signal output by the feedback control circuit 54.

The lamp 52 on the power box 22 is illuminated whenever a control signal is generated from the regulator, thus providing an indication of when the output voltage of the power supply is not at the desired level. It should be appreciated that with respect to the particular application of the present embodiment, it may be necessary to adjust the angular velocity of the rotor carrying the field winding 15 by varying the idling r.p.m. of the engine of the motor vehicle in order to attain the preselected output voltage. This is normally only necessary to accommodate loads having a high power drain.

For the provision of A.C. output voltage, a conventional D.C. to A.C. converter 32 may be connected across the output terminals 30a, 30b of the capacitor bridge circuit. The D.C. to A.C. converter 32 may be a chopper circuit triggered by a timing circuit and self commutated by an LC circuit, thereby generating a square wave A.C. voltage. The output of the D.C. to A.C. converter is connected to a standard three-pin electrical socket 33 for use in conjunction with a standard three-pin plug. The earth terminal 34 of the socket 33 is connected to a reference point 35 of the capacitor bridge circuit, which in the particular embodiment described, is the negative terminal 16b of the output of the rectifier 18.

In the described embodiment, provision is also made for the use of a D.C. power supply adapted to provide a D.C. voltage directly from output terminals 16a, 16b of the rectifier 18 to external loads which draw high current by throwing the switch 19 into the second position 19b and utilizing voltage supply rails 36a, 36b, as shown in FIG. 1. The provision of blocking diodes 23 prevents the application of high ripple currents to the input capacitors 24 and 25 when external loads are connected to the power box 22 and the voltage supply rails 36 at the same time.

It should be appreciated that the scope of the present invention is not limited to the scope of the specific embodiment described herein. Particularly, it should be appreciated that the invention is not limited to application upon a motor vehicle but may be utilized in other applications where both D.C. and A.C. power sources are available.

I claim:

1. An electrical power supply comprising:
   a first input connected to a substantially direct current (D.C.) voltage source; a second input connected to a substantially alternating current (A.C.) voltage source; a capacitor bridge circuit including input capacitor means, output capacitor means in parallel with said input capacitor means, and diodes; and an output connected across said output capacitor means;
   wherein said second input is provided in series with said input capacitor means, said first input is provided across said series connection of said input capacitor means and said second input and said diodes are configured to oppose discharge current flow from said output capacitor means to said input capacitor means, such that an effective cumulative charge is stored in the input capacitor means during one-half cycle of said A.C. voltage source, said charge being derived from the cumulative effect of said voltage sources on said input capacitor means, and said stored charge is transferred to said output capacitor means during the other half cycle of said A.C. voltage source together with the applied voltage of said A.C. voltage source during said other half cycle, thereby providing and sustaining a higher level of D.C. voltage at said output than obtained from said first input.

2. An electrical power supply as claimed in claim 1, wherein said input capacitor means includes a pair of serially connected input capacitors defining a first junction between said input capacitors, said output capacitor means includes a pair of serially connected output capacitors defining a second junction between said output capacitors, whereby said second input is provided across the first and second junctions, such that each half cycle of the A.C. voltage to be applied thereto in conjunction with the charge stored in said input capacitors may be alternatively transferred to the corresponding output capacitors.

3. An electrical power supply as claimed in claim 2, wherein said input capacitor means includes a plurality of input capacitor pairs in parallel, each having said second input provided across said first and second junctions thereof, and said A.C. voltage source being multi-phase, whereby a different phase is applied respectively to said second inputs, thereby reducing the ripple current in said output capacitor means.

4. An electrical power supply as claimed at claim 1, wherein said capacitor means includes a plurality of input capacitors each having a second input provided in series therewith, said series connections of said input capacitors and said second input being in parallel, and said A.C. voltage source being multi-phase, whereby a different phase is applied respectively to said second inputs, thereby reducing the ripple current in said output capacitor means.

5. An electrical power supply as claimed at claim 1, wherein a voltage sensing means is connected across the said output and a control means is connected to said voltage sensing means, whereby said voltage sensing means provides a signal indicative of the output voltage of the supply to said control means and the control means regulates the voltage at said inputs to provide control of said supply output voltage.

6. An electrical power supply as claimed in claim 5, wherein said voltage sensing circuit includes switching means to provide selection of different supply output voltages, whereby said signal may be altered.

7. An electrical power supply as claimed at claim 6, wherein said switching means is connected into said divider network whereby different resistor arrangements may be selected to reference said signal to a selected supply output voltage.

8. An electrical power supply as claimed at claim 5, wherein said voltage sensing means includes a voltage divider network connected across said supply output and a differential amplifier connected to the output of the divider network, the differential amplifier output adapted to provide said signal indicative of said supply output voltage.

9. An electrical power supply as claimed at claim 4, wherein said control means is isolated from said voltage sensing means and includes an input amplifier means to receive and amplify said signal, and a regulator to regulate said input voltage in response to said signal.

10. An electrical power supply as claimed at claim 9, wherein said regulator forms part of said regulated D.C. voltage source.

11. An electrical power supply as claimed at claim 1, wherein said A.C. voltage source is derived from an alternator, and said D.C. voltage source is derived from the rectified output of said alternator.

12. An electrical power supply as claimed at claim 11, wherein the field winding of said alternator is adapted to receive an excitation voltage from a regulated D.C. voltage source.

13. An electrical power supply as claimed at claim 1, wherein a D.C. to A.C. converter is incorporated across said output to provide an A.C. voltage source.

14. An electrical power supply as claimed at claim 13, wherein said converter is a chopper circuit, self commutated by an LC circuit and triggered by a timing circuit, thereby providing a A.C. square wave voltage output.

* * * * *

UNITED STATES PATENT AND TRADEMARK OFFICE
CERTIFICATE OF CORRECTION

PATENT NO. : 4,599,687

DATED : July 8, 1986

INVENTOR(S) : Bernard R. Smith

It is certified that error appears in the above-identified patent and that said Letters Patent is hereby corrected as shown below:

Column 8, line 10, Claim 9, "4" should be ---5---.

Signed and Sealed this

Ninth Day of December, 1986

*Attest:*

DONALD J. QUIGG

*Attesting Officer*        *Commissioner of Patents and Trademarks*